(12) United States Patent
La Roche et al.

(10) Patent No.: US 11,943,653 B2
(45) Date of Patent: Mar. 26, 2024

(54) DYNAMIC ADDITION OF NETWORK RESOURCES BASED ON APPLICATION FUNCTION NOTIFICATION

(71) Applicant: Cisco Technology, Inc., San Jose, CA (US)

(72) Inventors: Humberto Jose La Roche, Ocean, NJ (US); Vimal Srivastava, Bangalore (IN); Sri Gundavelli, San Jose, CA (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 17/566,267

(22) Filed: Dec. 30, 2021

(65) Prior Publication Data

US 2023/0217297 A1    Jul. 6, 2023

(51) Int. Cl.
*H04W 28/02*    (2009.01)
*H04W 72/543*    (2023.01)

(52) U.S. Cl.
CPC ..... *H04W 28/0268* (2013.01); *H04W 72/543* (2023.01)

(58) Field of Classification Search
None
See application file for complete search history.

(56) References Cited

U.S. PATENT DOCUMENTS

| 2012/0287784 | A1 | 11/2012 | Shatzkamer et al. | |
| 2013/0273928 | A1 | 10/2013 | Westerberg et al. | |
| 2016/0006500 | A1* | 1/2016 | Radpour | H04B 7/18539 455/427 |
| 2017/0034175 | A1 | 2/2017 | Leung et al. | |
| 2017/0332282 | A1 | 11/2017 | Dao | |
| 2021/0176646 | A1* | 6/2021 | Pabla | H04W 16/14 |
| 2021/0266782 | A1 | 8/2021 | Guha et al. | |
| 2021/0274472 | A1* | 9/2021 | Foti | H04W 72/56 |
| 2022/0232450 | A1* | 7/2022 | Shariat | H04W 4/80 |
| 2022/0295363 | A1* | 9/2022 | Tamura | H04L 12/1407 |

FOREIGN PATENT DOCUMENTS

| WO | WO2018231028 | * | 12/2018 |
| WO | WO2022248035 | * | 12/2022 |

* cited by examiner

*Primary Examiner* — Andre Tacdiran
(74) *Attorney, Agent, or Firm* — Polsinelli P.C.

(57) ABSTRACT

The present technology is generally directed to dynamically adding network resources based on an application function (AF) notification. The present technology can determine, by an AF of a service provider, a network congestion on a network, the network congestion indicating that network resources for servicing a user device using services of the service provider do not meet corresponding Quality of Service (QoS) requirements. Further, the present technology can transmit a notification by the AF to a core network of a network provider to request additional network resources to be allocated for servicing the user device, the network provider providing network connectivity for the user device to receive the services provided by the service provider.

19 Claims, 6 Drawing Sheets

DYNAMIC ADDITION OF NETWORK RESOURCES BASED ON APPLICATION FUNCTION NOTIFICATION

DESCRIPTION OF THE RELATED TECHNOLOGY

The subject matter of this disclosure relates in general to the field of wireless networking, and more particularly, to systems and methods for dynamically adding network resources based on an application function (AF) notification.

BACKGROUND

Compared to previous cellular network generations, 5G extends the catalog of applicable spectrum frequency bands and offers access to a broad range of spectrum resources. As such, in 5G deployments, efficient use of all spectrum bands and resources is key to delivering a broad range of 5G services with optimal QoS (Quality of Service) and QoE (Quality of Experience). 5G services are in demand with business verticals and service providers. They need to reach endpoints over 5G deployments. A customer of a 5G service can be a service provider (e.g. Netflix) motivated by the desire to offer exclusive content services to endpoints that subscribe to its content services. Other examples include electrical utilities wishing to reach their automated grid actuators and controllers wirelessly, oil and gas companies wishing to the same, and municipalities, educational authorities, and law enforcement agencies wishing to leverage wireless connectivity.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
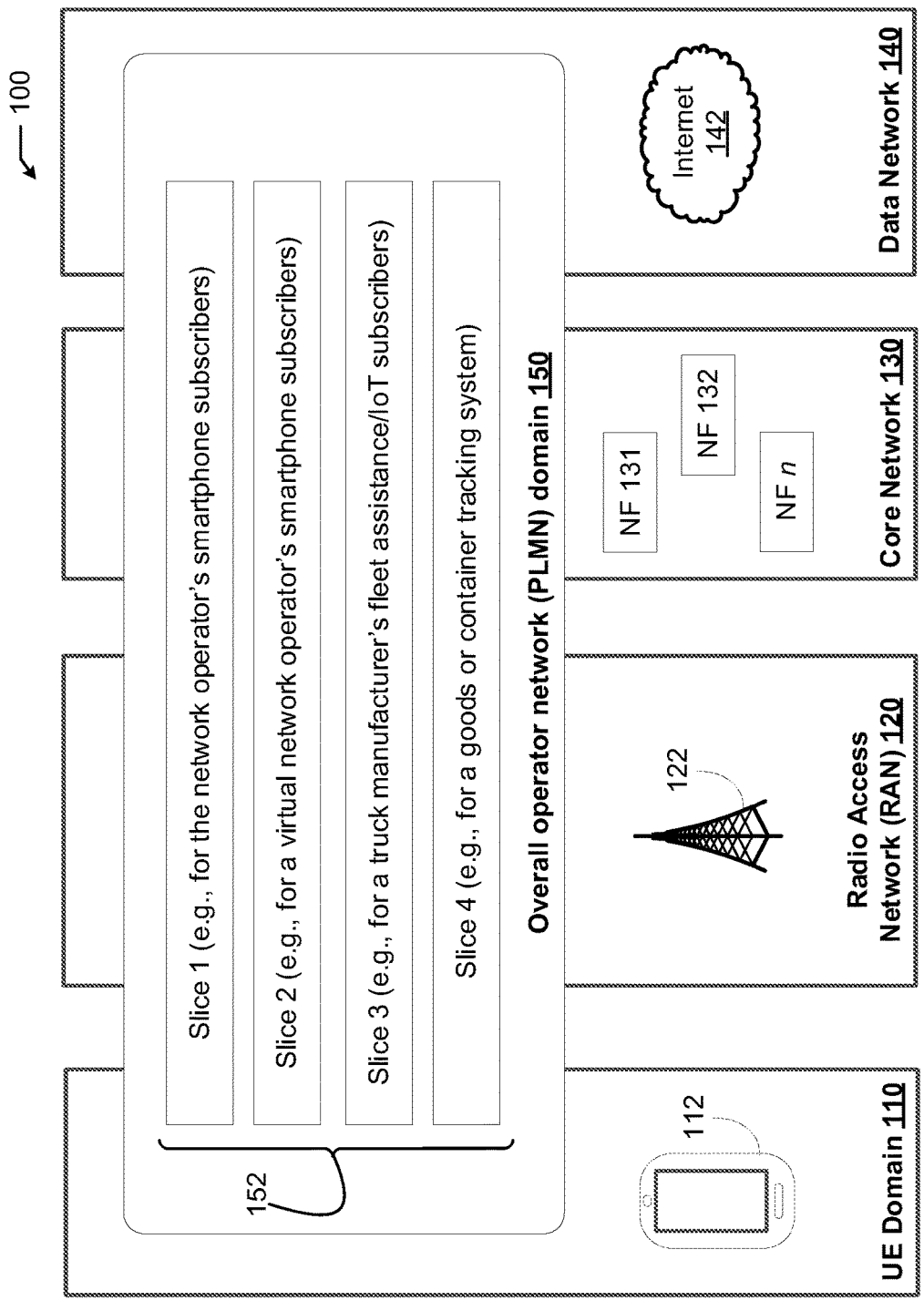
FIG. 1 depicts an exemplary schematic representation of a 5G network environment in which one or more aspects of the present disclosure may operate.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Disclosed herein are systems, methods, and computer-readable media for dynamically adding network resources based on an AF notification.

In one aspect, a method of dynamically adding network resources includes determining, by Application Function (AF) of a service provider, a network congestion on a network. The network congestion may indicate that network resources for servicing a user device using services of the service provider do not meet corresponding Quality of Service (QoS) requirements. The method further includes transmitting a notification by the AF to a core network of a network provider to request additional network resources to be allocated for servicing the user device. The network provider may provide network connectivity for the user device to receive the services provided by the service provider.

In another aspect, the additional network resources to be allocated are within a spectrum owned by the AF in a radio access network operated by the network provider.

In another aspect, the notification is an N5 notification.

In another aspect, in determining the network congestion, the method includes determining, based on multimedia protocols, that more network resources are required to meet the corresponding QoS requirements.

In another aspect, the network congestion is determined based on a Quality of Service Notification Control (QNC) notification sent by a base station of the network provider to the core network of the network provider.

In another aspect, when transmitting the notification, the method of dynamically adding network resources includes transmitting the notification from the AF to a Policy Control Function (PCF) of the core network of the network provider, the PCF forwarding the notification to at least one of a Session Management Function (SMF) and an Access and Mobility Management Function (AMF) of the core network of the network provider.

In another aspect, in response to receiving the notification, a Radio Access Network (RAN) of the network provider adds more network resources for servicing the user device.

In another aspect, the additional network resources are allocated to a spectrum operated by the service provider.

In one aspect, a system includes one or more processors and a computer-readable medium. The computer-readable medium comprise instructions stored therein, which when executed by the processors, cause the processors to determine, by Application Function (AF) of a service provider, a network congestion on a network, the network congestion indicating that network resources for servicing a user device using services of the service provider do not meet corresponding Quality of Service (QoS) requirements, and transmit a notification by the AF to a core network of a network provider to request additional network resources to be allocated for servicing the user device, the network provider providing network connectivity for the user device to receive the services provided by the service provider.

In one aspect, a non-transitory computer-readable storage medium comprising instructions stored therein, which when executed by one or more processors, cause the processors to determine, by Application Function (AF) of a service provider, a network congestion on a network, the network congestion indicating that network resources for servicing a user device using services of the service provider do not meet corresponding Quality of Service (QoS) requirements, and transmit a notification by the AF to a core network of a network provider to request additional network resources to be allocated for servicing the user device, the network provider providing network connectivity for the user device to receive the services provided by the service provider.

DESCRIPTION OF EXAMPLE EMBODIMENTS

The following acronyms are used throughout the present disclosure, provided below for convenience.
AF: Application Function
AMF: Access and Mobility Management Function
MME: Mobility Management Entity
NEF: Network Exposure Function
OAM: Operations, Administration, and Maintenance
PCF: Policy Control Function
RAN: Radio Access Network
SMF: Session Management Function
UDM: Unified Data Management
UPF: User Plane Function Compared to previous cellular network generations, 5G extends the catalog of applicable spectrum frequency bands (e.g., high-, mid-, and low-bands) and offers access to a broad range of spectrum resources. As such, in 5G deployments, efficient use of all spectrum bands and resources is key to delivering a broad range of 5G services with optimal Quality of Service (QoS) and Quality of Experience (QoE). Therefore, entities that have access to spectrum resources or have capabilities of spectrum managements may desire to add more radio resources (e.g., spectrum, Physical Resource Blocks (PRBs)) based on application performance to optimize the QoE. Such entities can include but are not limited to 5GaaS operators/providers or service providers that may or may not own spectrum resources (e.g., Netflix, Disney+ Hotstar, Amazon Prime, etc.). Other non-limiting examples of entities include electrical utilities wishing to reach their automated grid actuators and controllers wirelessly, oil and gas companies wishing to the same, and municipalities, educational authorities, and law enforcement agencies wishing to leverage wireless connectivity. These entities may be referred to as service providers or content providers described above.

According to 3GPP in 5G specifications, an introduction of QoS Notification Control (QNC) can notify the core network (e.g., 5GC) when RAN is not able to meet the QoS requirements so that the core network, upon receiving QNC notification, can change QoS rules to reduce the bandwidth requirements and/or notify Application Function (AF) to take corrective action. However, applications using HTTP adaptive streaming would have already adjusted to available radio resources, thereby the QNC notification becoming irrelevant.

According to the present disclosure, a spectrum management entity can determine that there is radio congestion (e.g., by using its application analytics platform) and send an AF notification to the RAN along with the radio carriers it owns. The RAN then may add the radio spectrum and start allocating resource blocks from this additional band to subscribers of the service provider.

The present technology includes systems, methods, and computer-readable media for solving these problems and discrepancies. Specifically, systems, methods, and computer-readable media for dynamically adding network resources based on an AF notification.

FIG. 1 depicts an exemplary schematic representation of a 5G network environment 100 in which one or more aspects of the present disclosure may operate. As illustrated, network environment 100 is divided into four domains, each of which will be explained in greater depth below; User Equipment (UE) domain 110, e.g., of one or more enterprise, in which a plurality of user cellphones or other connected devices 112 reside; Radio Access Network (RAN) domain 120, in which a plurality of radio cells, base stations, towers, or other radio infrastructure 122 resides; Core Network 130, in which a plurality of Network Functions (NFs) 131, 132, . . . , n reside; and Data Network 140, in which one or more data communication networks such as the Internet 142 reside. Additionally, Data Network 140 can support SaaS providers configured to provide SaaSs to enterprises, e.g. to users in UE domain 110.

Core Network 130 contains a plurality of Network Functions (NFs), shown here as NF 131, NF 132 . . . NF n. In some examples, core network 130 is a 5G core network (5GC) in accordance with one or more accepted 5GC architectures or designs. In some instances, core network 130 is an Evolved Packet Core (EPC) network, which combines aspects of the 5GC with existing 4G networks. Regardless of the particular design of core network 130, the plurality of NFs typically executes in a control plane of core network 130, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some examples, the plurality of NFs of core network 130 can include one or more Access and Mobility Management Functions (AMF; typically used when core network 130 is a 5GC network) and Mobility Management Entities (MME; typically used when core network 130 is an EPC network), collectively referred to herein as an AMF/MME for purposes of simplicity and clarity. In some instances, an AMF/MME can be common to or otherwise shared by multiple slices of the plurality of network slices 152, and in some examples an AMF/MME can be unique to a single one of the plurality of network slices 152.

The same is true of the remaining NFs of core network 130, which can be shared amongst one or more network slices or provided as a unique instance specific to a single one of the plurality of network slices 152. In addition to NFs comprising an AMF/MME as discussed above, the plurality of NFs of the core network 130 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 100, an overall operator network domain 150 is defined. The operator network domain 150 is in some examples a Public Land Mobile Network (PLMN) and can be thought of as the carrier or business entity that provides cellular service to the end-users in UE domain 110. Within the operator network domain 150, a plurality of network slices 152 are created, defined, or otherwise provisioned in order to deliver a desired set of defined features and functionalities, e.g. SaaSs, for a certain use case or corresponding to other requirements or specifications. Note that network slicing for the plurality of network slices 152 is implemented in end-to-end fashion, spanning multiple disparate technical and administrative domains, including management and orchestration planes (not shown). In other words, network slicing is performed from at least the enterprise or subscriber edge at UE domain 110, through the RAN 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates network domain, and Slice 2, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that these network slices 152 are provided for purposes of illustration, and in accordance with the present disclosure, and the operator network domain 150 can implement any number of network slices as needed, and can implement these network slices for purposes, use cases, or subsets of users and user equipment in addition to those listed above. Specifically, the operator network domain 150 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

Figure 2:
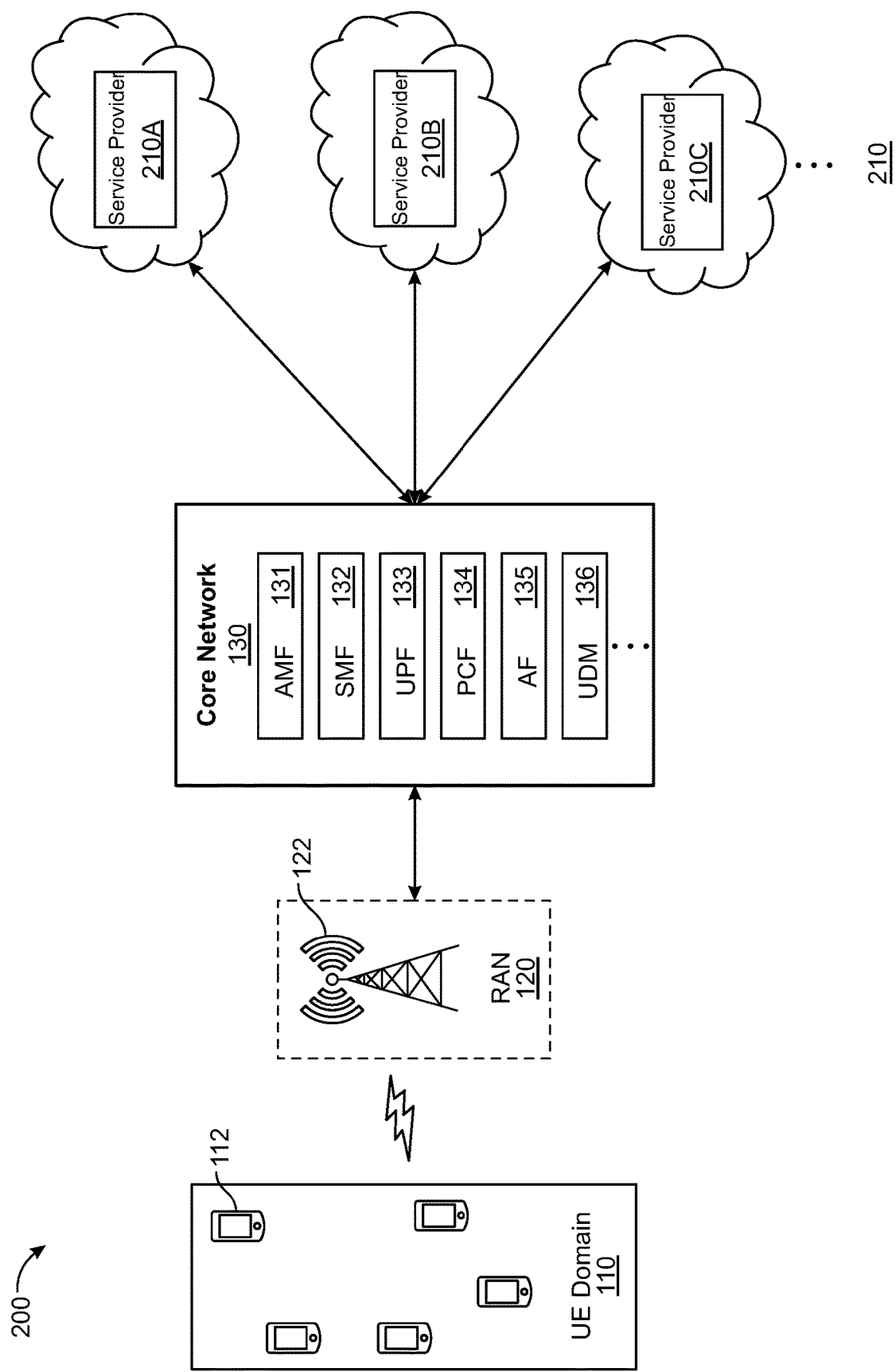
FIG. 2 illustrates an example 5G network architecture including service providers, according to one or more examples of the present disclosure.

FIG. 2 illustrates an example 5G network architecture 200, in which one or more aspects of the present disclosure may operate. Similar to 5G network environment 100 illustrated in FIG. 1, 5G network architecture 200 comprises three domains; UE domain 110 (e.g., of one or more enterprise, in which a plurality of user devices 112 reside); RAN domain 120, in which a plurality of radio cells, base stations, towers, or other infrastructure 122 resides; and core network 130, in which a plurality of network functions (e.g., AMF 131, SMF 132, UPF 133, PCF 134, AF 135, UDM 136, etc.) reside. Also, 5G network architecture 200 further comprises service providers 210A, 210B, 210C, etc. (collectively, service provider 210), all of which may provide services such as content services to users 112 in UE domain 110. In some examples, service provider 210 may be a customer of a network provider (e.g., for LTE or 5G service, etc.).

According to some examples, RAN 120 provides radio access and assists to coordinate network resources across devices such as UEs 112 in UE domain 110. In some instances, base stations 122 in RAN 120 are primarily connected via backhaul to core network 130 and reside between UEs 112 or any remotely controlled machine to provide a connection with core network 130.

As previously described with reference to FIG. 1, core Network 130 contains a plurality of NFs that execute in a control plane of core network 130. Referring to FIG. 2, such NFs may include AMF 131, SMF 132, UPF 133, PCF 134, AF 135, UDM 136, etc. Various other NFs can be provided without departing from the scope of the present disclosure, as would be appreciated by one of ordinary skill in the art.

In some instances, core network 130 can be a neutral host network (NHN) that allows multiple mobile network operators (MNOs) and other communications service providers (CSPs) to share infrastructure, in other words, to leverage existing cellular networks to provide services.

In some examples, service provider 210 (also referred as application provider) may be a customer of a 5G service to reach endpoints, for example, user devices 112 over the 5G access so that service provider 210 may provide services (e.g., content or media services) to endpoints (e.g., user devices) that subscribe to their services such as audio/video streaming and media services, online video sharing services, etc. For example, some operators, neutral host providers, or other companies may provide 5G services (e.g., 5G-as-a-Service (5GaaS)) as a product to business verticals such as service providers that need to reach endpoints over 5G access.

Figure 3:
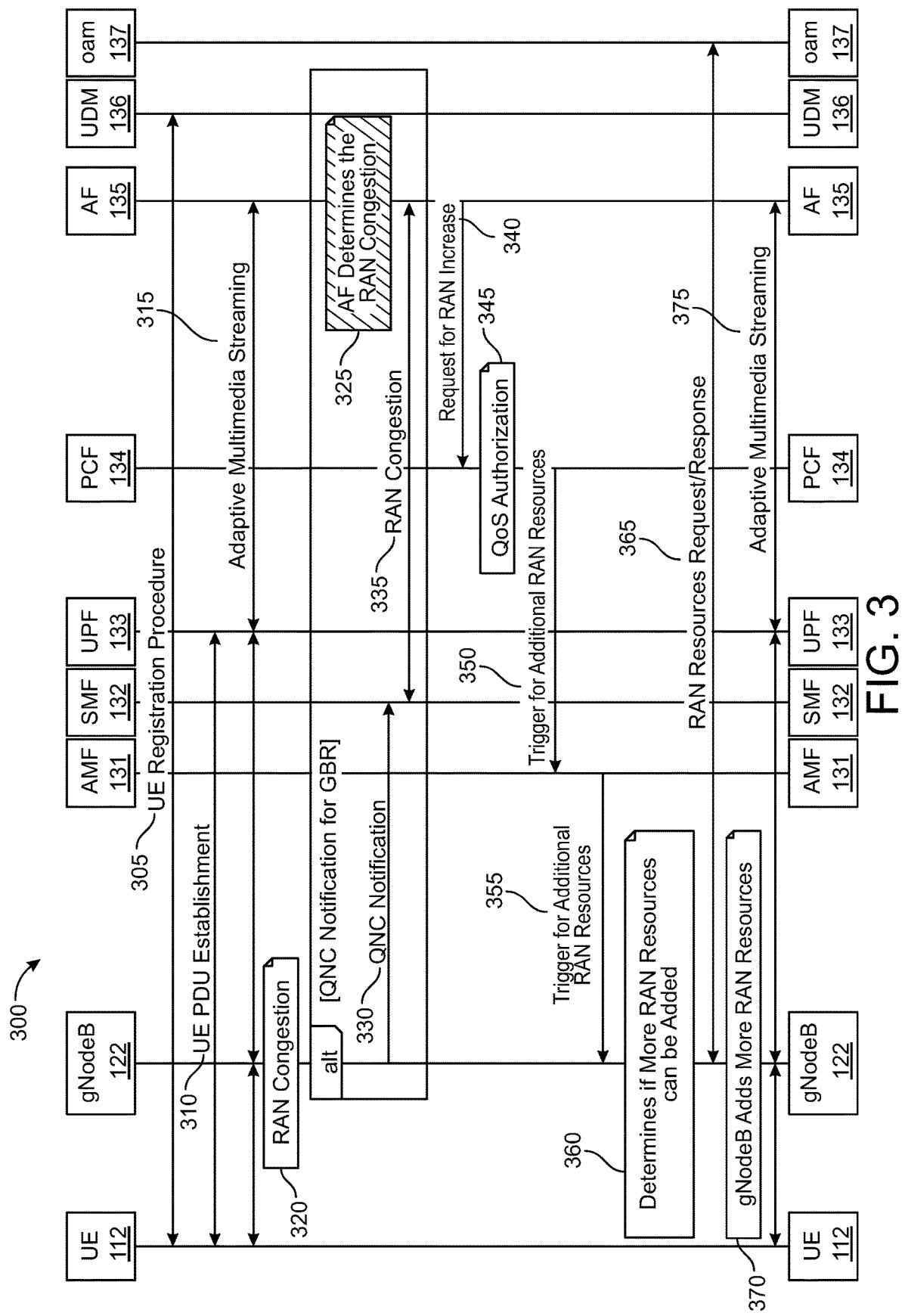
FIG. 3 illustrates an example communication diagram for dynamic addition of network resources based on an AF notification according to one or more examples of the present disclosure.

FIG. 3 illustrates an example communication diagram 300 for dynamic addition of network resources based on an AF notification according to one or more examples of the present disclosure. In particular, communication diagram 300 illustrates communications between various network entities and functions that can be configured to implement example network resources addition processes of the present disclosure in a 5G network. The variously illustrated network entities and functions include UE 112, gNodeB 122, AMF 131, SMF 132, UPF 133, PCF 134, AF 135, UDM 136, and oam 137. As would be understood by those of skill in the art, the illustrated network entities provide examples of various network architecture components that can be used to facilitate the example network resources addition processes described herein. However, it is understood that a greater (or fewer) number of entities may be deployed to practice the disclosed technology.

According to some examples, the communication process illustrated in communication diagram 300 begins with step 305 in which UE 112 initiates UE registration procedure from UDM 136.

Next, at step 310, UE establishes a PDU session with UPF 133, for example, for multimedia services. Then, adaptive multimedia streaming is performed at step 315. For example, multimedia streaming may flow between UE 112 and AF 135, which may be operated by service provider 210 as illustrated in FIG. 2.

According to some examples, there may be two ways to determine RAN congestion (i.e., to determine that UE 112 is not getting enough network resources). For example, application server based on multimedia protocols (e.g., Real-Time Transport Control Protocol (RTCP), Hypertext Transfer Protocol (HTTP) adaptive streaming, etc.) may determine that more network resources in RAN (e.g., RAN 120) are required to meet the QoS requirements. For example, the primary function of RTCP is to provide feedback on the quality of QoS in media distribution by periodically sending statistics information such as transmitted octet and packet counts, packet loss, packet delay variation, and round-trip delay time to participants in a streaming multimedia session. As such, based on such statistics information, application server can determine RAN congestion, in other words, whether more network resources in RAN are required to meet the QoS requirements.

Alternatively, when gNodeB 122 determines a RAN congestion, gNodeB 122 in RAN 120 may send a Quality of Service Notification Control (QNC) notification, for example, for Guaranteed Bit Rate (GBR) to core network 130. For example, at step 320, gNodeB 122 determines a RAN congestion. Specifically, gNodeB 122 may perform the scheduling of packets towards UE 112. For each packet, there are QoS attributes associated and when there is an overload condition, gNodeB 122 in RAN 120 may not be able to schedule the packets par its QoS requirements resulting in packet delays since RAN 120 has finite radio resources. Based on such inability to schedule for packets or packet delays, gNodeB 122 can determine a RAN congestion.

In some examples, gNodeB 122 sends a QNC notification to SMF 132 at step 330, of which information is relayed to AF 135. Then, information related to the RAN congestion is forwarded from SMF 132 to AF 135 at step 335. At step 325, AF 135 determines the RAN congestion.

Next, at step 340, once AF 135 determines the RAN congestion, AF 135 may send a notification (e.g., N5 notification) to PCF 134 to trigger increased bandwidth. For example, the AF notification may include a request for RAN increase. In some examples, AF 135 may also include spectrum information in the notification, such as the spectrum it may own.

According to some example, PCF 134 performs QoS authorization at step 345. For example, when a PDU session is established, SMF 132 will query PCF 134 for QoS policies for the various QoS flows present in the PDU session. In response, PCF 134 provides QoS policies such as Maximum Bit Rate (MBR) or Guaranteed Bit Rate (GBR) QoS flow ID (QFI) and many other QoS attributes. Network ensures that MBR or GBR is met or it will hit the user experience.

In some examples, PCF 134 forwards the notification to RAN 120 via SMF 132/AMF 131 to trigger additional RAN resources at step 350, which is then relayed to gNodeB 122 at step 355.

In some examples, gNodeB 122 then determines if more RAN resources can be added at step 360. Next, gNodeB 122 may send a RAN resources request to OAM 137 and receives a response at step 365.

Figure 4:
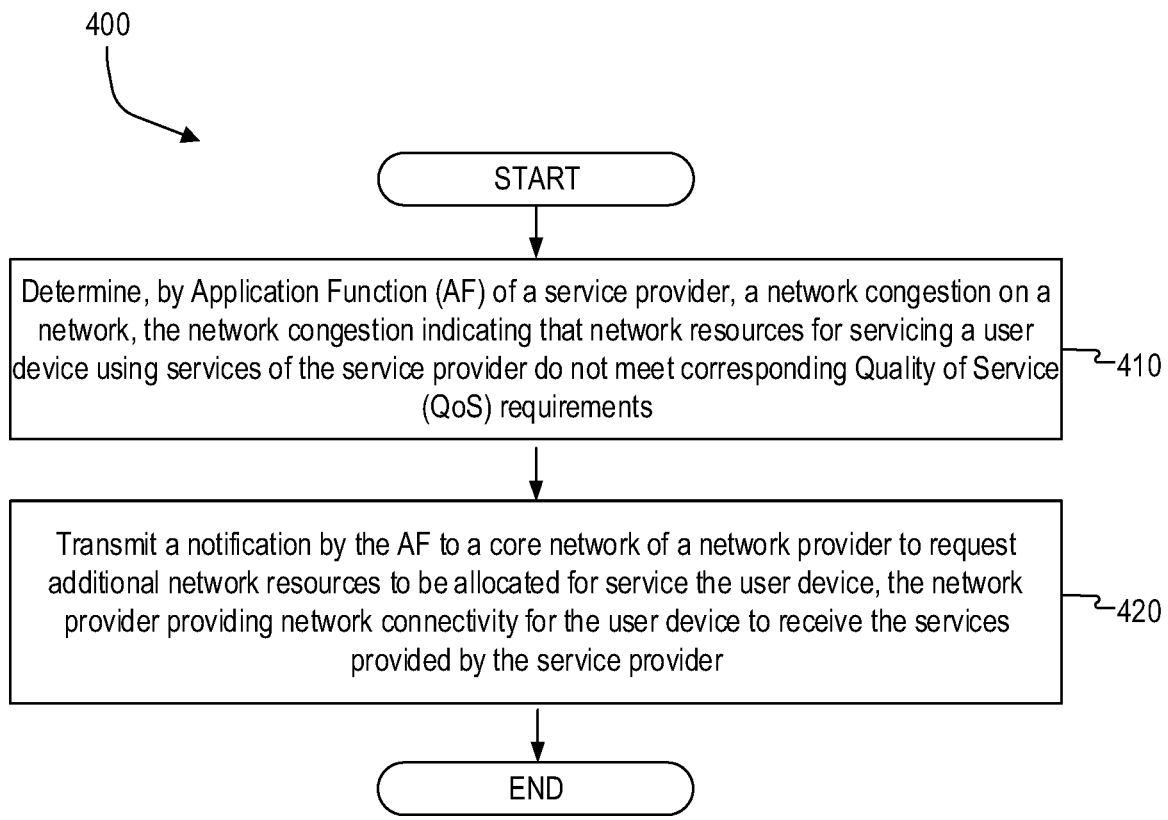
FIG. 4 illustrates a flowchart of a method for dynamically adding network resources based on an AF notification according to one or more examples of the present disclosure.

According to some examples, gNodeB 122 may add more RAN resources at step 370. Then, adaptive multimedia streaming can continue with additional RAN resources at step 375. The disclosure now turns to FIG. 4, where an example flow chart for performing a dynamic addition of network resources based on an AF notification is described. FIG. 4 may embody the details of the non-limiting example process of FIG. 3 described above.

FIG. 4 illustrates a flowchart of a method 400 for dynamically adding network resources based on an AF notification according to one or more examples of the present disclosure. Although the example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements method 400 may perform functions at substantially the same time or in a specific sequence.

At step 410, method 400 includes determining, by an AF of a service provider, network congestion on a network. In some examples, the network congestion may indicate that network resources for servicing a user device using services of the service provider do not meet corresponding Quality of Service (QoS) requirements.

For example, AF 135 illustrated in FIGS. 2 and 3 may determine network congestion on a network. By way of an example, the network congestion may indicate that network resources for servicing a user device (e.g., UE 112 illustrated in FIGS. 1-3) using services of the service provider (e.g., service provider 210 in FIG. 2) do not meet corresponding Quality of Service (QoS) requirements. QoS requirements may be determined according to existing and/or agreed upon Service Level Agreements (SLAs) between users (e.g., subscribers) and their respective service provider and/or network provider.

In some examples, the network congestion may be determined based on a Quality of Service Notification Control (QNC) notification sent by a base station (e.g., gNodeB 122) of the network provider to the core network (e.g., core network 130 in FIGS. 1 and 2) of the network provider.

In another example of determining the network congestion at step 410, method 400 comprises determining that more network resources are required to meet the corresponding QoS requirements based on multimedia protocols. For example, AF 135 illustrated in FIGS. 2 and 3 may determine, based on multimedia protocols such as RTCP or HTTP, that more network resources are required to meet the corresponding QoS requirements.

According to some examples, at step 420, method 400 includes transmitting a notification by the AF to a core network of a network provider to request additional network resources to be allocated for servicing the user device. In some examples, the network provider may provide network connectivity for the user device to receive the services provided by the service provider. While a conventional method of codec adaptation may degrade the service when radio conditions change, the method of allocating RAN resources based on the service feedback in accordance with the present disclosure does not cause the degraded service.

For example, AF 135 illustrated in FIGS. 2 and 3 may transmit a notification to a core network (e.g., core network 130 in FIGS. 1 and 2) of a network provider to request additional network resources to be allocated for servicing the user device (e.g., UE 112 in FIGS. 1-3) where the network provider provides network connectivity for the user device (e.g., UE 112 in FIGS. 1-3) to receive the services provided by the service provider.

In some examples, the notification may be an N5 notification. For example, the notification can be transmitted via the N5 interface, which is a reference point between PCF and AF (e.g., PCF 134 and AF 135 as illustrated in FIGS. 2 and 3).

In some examples, the transmitting of the notification at step 420 may include transmitting the notification from AF to PCF of the core network of the network provider and forwarding the notification, by the PCF, to at least one of a SMF and an AMF of the core network of the network provider. For example, referring to FIGS. 2 and 3, AF 135 may transmit the notification to request additional network resources to PCF 134. Then, PCF 134 may forward the notification to SMF 132 and/or AMF 131 of core network 130.

In some instances, the notification from AF to trigger additional network resources may further include meta-data associated with the spectrum resources. For example, the visibility at AF 135 can benefit the user experience. The user experience has a relation to the spectrum resources, chosen slice, and the QoS template chosen for the QoS flows. AF 135 may provide such indications in the form of Rx or other interfaces and allow the network elements to perform specific actions. Furthermore, meta-data included in the trigger (e.g., the notification from AF) can include, but is not limited to, spectrum resources and specific actions. In some instances, AF 135 can translate such visibility that it has from the application layer and send the explicit events to the elements in the mobile network operator (MNO) network.

In some examples, in response to receiving the notification, a RAN of the network provider adds more network resources for servicing the user device. For example, RAN 120 as illustrated in FIG. 2 of the network provider may add more network resources for servicing UEs 112 in UE domain 110. In some examples, the added network resources in the form of carriers can be grouped into a carrier aggregation group.

In some examples, the additional network resources may be allocated to a spectrum operated by the service provider. For example, service provider 210 as illustrated in FIG. 2 may own spectrum (e.g., Netflix has access to a spectrum of 1800-1820 Mhz and has spectrum management capabilities via its corresponding application analytics platform).

In some examples, the additional network resources provided for the network may be in the form of either carriers or physical resource blocks (PRBs).

In some examples, the transmitting of the notification from the AF to the core network may be mediated by a NEF. For example, when AF 135 triggers to add additional RAN resources (e.g., as described in step 340 in FIG. 3), such trigger may be mediated by NEF (not shown in FIG. 3).

According to some examples, the additional network resources may be allocated to one or more subscribers of the network provider. For example, a base station (e.g., gNodeB 122 as illustrated in FIGS. 2 and 3) may allocate the additional network resources to one or more subscribers of the network provider.

In some examples, the additional network resources to be allocated can be within a spectrum owned by the AF in a radio access network operated by the network provider.

In one example, the addition of network resources based on the AF notification in the above-described deployment can provide the advantage of enabling the service provider itself to monitor the network performance and request additional network resources to optimize the QoE. A service provider (i.e., content provider or application provider) has more visibility on the end-user experience than the network provider (e.g., 5GaaS provider). With the use of the HTTP adaptive bit-rate streaming, the service provider may have a superlative indication of the network performance that the end-user is receiving by simply monitoring the streaming rate, which has the virtue of adapting to channel conditions. Also, endpoints (e.g., streaming devices or UE 112 as illustrated in FIGS. 1-3) have the telemetry on the over-the-top (OTT) media service channel, which may provide additional performance indications. Based on the telemetry, the service provider can draw performance maps of the 5G service in different locations and may choose to modify the spectrum resources based on the application performance visibility (e.g., to provide additional network resources in the locations that need more resources so that the QoE can be optimized). A network provider may not have the same visibility into the use of an application provided by a service provider to its subscribers, the way the service provider may have visibility. This inferior visibility by the network provider may be due to a number of factors including, but not limited to, encrypted traffic between the service provider and its subscribers. Accordingly, a network provider may not be capable of performing the above-described process of the present technology.

Furthermore, an example advantage also includes having an AF provide a request for additional network resources, for example, in the form of the N5 notification or other applicable interfaces since AF performs operations for retrieving resources, applications traffic routing, exposing services to end-users, and exposing the application layer for interacting with 5G network resources and therefore has the visibility into the user experience (e.g., spectrum resources, chosen slice, or QoS templates chosen for the QoS flows, etc.). More specifically, the visibility on the application behavior and user experience is at the AF and not at the RAN of the network provider. As such, there exists a value in moving such intelligence (e.g., visibility) in the form of the notification and meta-data to the RAN via the AF.

Figure 5:
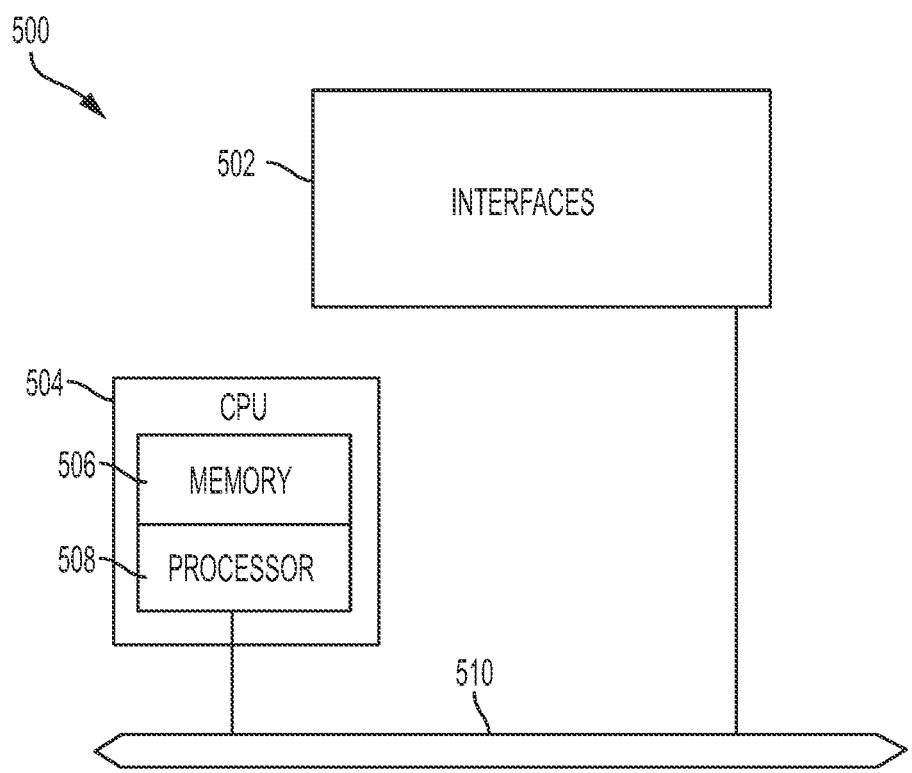
FIG. 5 illustrates an example network device, according to some aspects of the present disclosure.

FIG. 5 illustrates an example network device 500 suitable for performing switching, routing, load balancing, and other networking operations. Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 504 to efficiently perform routing computations, network diagnostics, security functions, etc.

Although the system shown in FIG. 5 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

Figure 6:
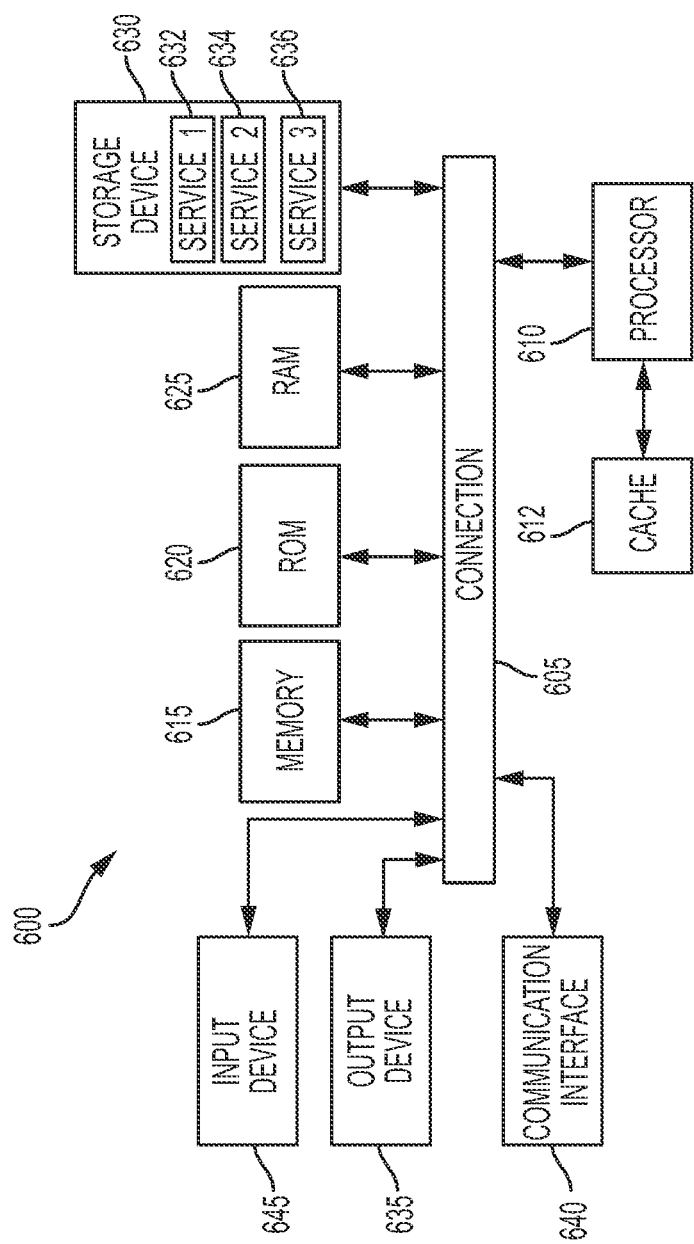
FIG. 6 shows an example computing system, which can be for example any computing device that can implement components of the system.

FIG. 6 illustrates an example computing system 600 including components in electrical communication with each other using a connection 605 upon which one or more aspects of the present disclosure can be implemented. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple datacenters, a peer network, etc. In some instances, one or more of the described system components represents many such components each performing some or all of the function for which the component is described. In some examples, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some examples, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
    determining, by Application Function (AF) of a service provider, a network congestion on a network, the network congestion indicating that network resources for servicing a user device using services of the service provider do not meet corresponding Quality of Service (QoS) requirements; and
    transmitting a notification by the AF to a core network of a network provider to request additional network resources to be allocated for servicing the user device, the additional network resources being within a spectrum owned by the AF in a radio access network operated by the network provider, the network provider providing network connectivity for the user device to receive the services provided by the service provider.

2. The method of claim 1, wherein the notification is an N5 notification.

3. The method of claim 1, wherein determining the network congestion comprises:
    determining, based on a multimedia protocol, that more network resources are required to meet the corresponding QoS requirements.

4. The method of claim 1, wherein the network congestion is determined based on a Quality of Service Notification Control (QNC) notification sent by a base station of the network provider to the core network of the network provider.

5. The method of claim 1, wherein the transmitting the notification includes transmitting the notification from the AF to a Policy Control Function (PCF) of the core network of the network provider, the PCF forwarding the notification to at least one of a Session Management Function (SMF) and an Access and Mobility Management Function (AMF) of the core network of the network provider.

6. The method of claim 5, wherein, in response to receiving the notification, a Radio Access Network (RAN) of the network provider adds more network resources for servicing the user device.

7. The method of claim 1, wherein the additional network resources are allocated to a spectrum operated by the service provider.

8. A system for dynamically adding network resources, comprising:
    one or more computer-readable media comprising computer-readable instructions; and
    one or more processors configured to execute the computer-readable instructions to:
        determine, by Application Function (AF) of a service provider, a network congestion on a network, the network congestion indicating that network resources for servicing a user device using services of the service provider do not meet corresponding Quality of Service (QoS) requirements, and
        transmit a notification by the AF to a core network of a network provider to request additional network resources to be allocated for servicing the user device, the additional network resources being within a spectrum owned by the AF in a radio access network operated by the network provider, the network provider providing network connectivity for the user device to receive the services provided by the service provider.

9. The system of claim 8, wherein the notification is an N5 notification.

10. The system of claim 8, wherein the one or more processors are further configured to execute the computer-readable instructions to:
    determine, based on a multimedia protocol, that more network resources are required to meet the corresponding QoS requirements.

11. The system of claim 8, wherein the network congestion is determined based on a Quality of Service Notification Control (QNC) notification sent by a base station of the network provider to the core network of the network provider.

12. The system of claim 8, wherein the transmitting the notification includes transmitting the notification from the AF to a Policy Control Function (PCF) of the core network of the network provider, the PCF forwarding the notification to at least one of a Session Management Function (SMF) and an Access and Mobility Management Function (AMF) of the core network of the network provider.

13. The system of claim 12, wherein, in response to receiving the notification, a Radio Access Network (RAN) of the network provider adds more network resources for servicing the user device.

14. The system of claim 8, wherein the additional network resources are allocated to a spectrum operated by the service provider.

15. One or more non-transitory computer-readable media comprising computer-readable instructions, which when executed by one or more processors, cause the processors to:
    determine, by Application Function (AF) of a service provider, a network congestion on a network, the network congestion indicating that network resources for servicing a user device using services of the service provider do not meet corresponding Quality of Service (QoS) requirements; and
    transmit a notification by the AF to a core network of a network provider to request additional network resources to be allocated for servicing the user device, the additional network resources being within a spectrum owned by the AF in a radio access network operated by the network provider, the network provider providing network connectivity for the user device to receive the services provided by the service provider.

16. The one or more non-transitory computer-readable media of claim 15, the notification is an N5 notification.

17. The one or more non-transitory computer-readable media of claim 15, wherein the execution of the computer-readable instructions further cause the one or more processors to:
    determine, based on a multimedia protocol, that more network resources are required to meet the corresponding QoS requirements.

18. The one or more non-transitory computer-readable media of claim 15, the network congestion is determined based on a Quality of Service Notification Control (QNC) notification sent by a base station of the network provider to the core network of the network provider.

19. The one or more non-transitory computer-readable media of claim 15, the transmitting the notification includes transmitting the notification from the AF to a Policy Control Function (PCF) of the core network of the network provider, the PCF forwarding the notification to at least one of a Session Management Function (SMF) and an Access and Mobility Management Function (AMF) of the core network of the network provider.

* * * * *